April 4, 1944.  J. H. CHILES, JR  2,345,584
AUTOMATIC SHORT CIRCUITING DEVICE
Filed Sept. 1, 1942
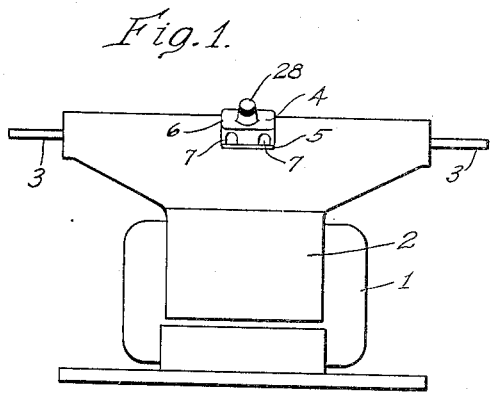
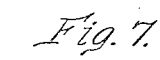
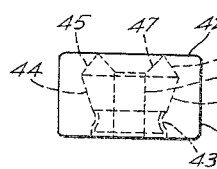
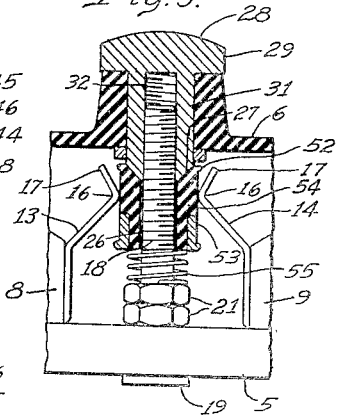
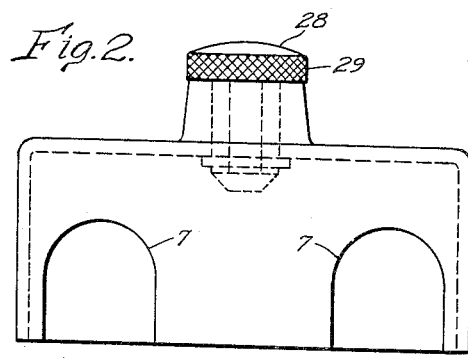
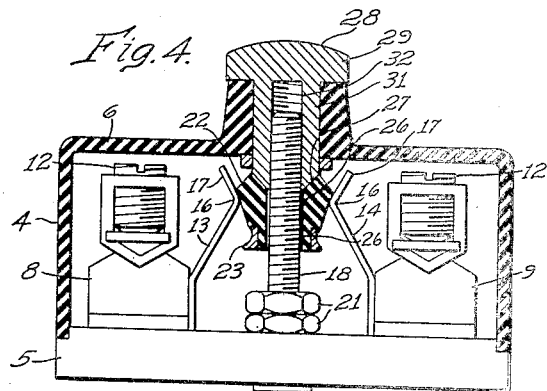
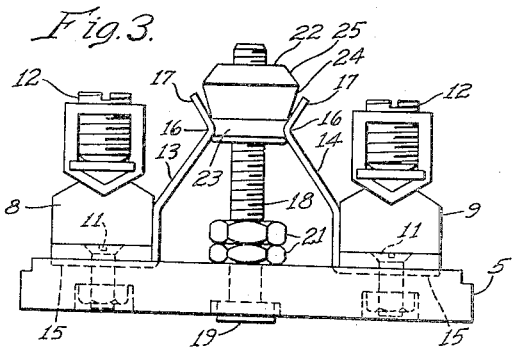
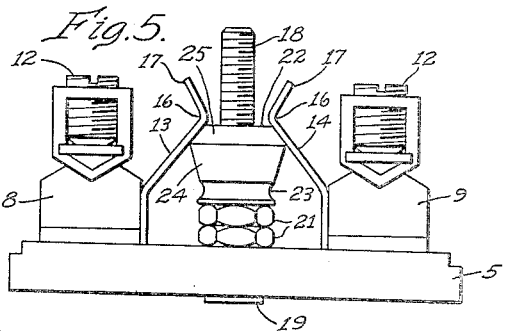
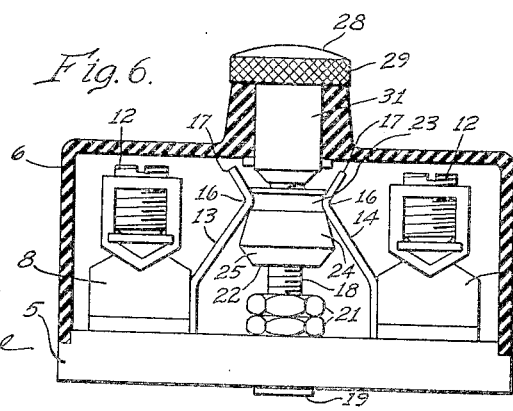
WITNESSES:
INVENTOR
John H. Chiles, Jr.
BY
Franklin E. Hershy
ATTORNEY Patented Apr. 4, 1944

2,345,584

UNITED STATES PATENT OFFICE 2,345,584

AUTOMATIC SHORT CIRCUITING DEVICE

John H. Chiles, Jr., Sharon, Pa., assignor to Westinghouse Electric & Manufacturing Company, East Pittsburgh, Pa., a corporation of Pennsylvania Application September 1, 1942, Serial No. 456,943

12 Claims. (Cl. 200—50)

My invention relates to current transformers, and particularly to terminal blocks therefor that are provided with means for short circuiting the secondary winding of the current transformer.

It is desirable that the secondary winding of a current transformer be maintained short circuited when it is not connected to a load circuit, since, when the primary winding is energized and the secondary winding of the transformer is open circuited, the impedance of the primary circuit may be large and the voltage of the secondary circuit so high as to damage the insulation of the transformer or cause injury to persons connecting instruments to the secondary circuit of the transformer. It is also desirable that the short circuit connection between the secondary terminals of the transformer be removed when a load circuit is connected to the terminals in order that the load circuit may function properly.

My invention contemplates the provision of a terminal block for current transformers comprising a base for supporting terminals for the secondary winding thereof and a short-circuiting switch that is normally automatically biased to a circuit closing position for closing a circuit between the secondary terminals of the transformer and provided with a cover for the base which may be attached to it, and when so attached, causes the switch contacts to become separated thus interrupting the circuit between the secondary terminals. When it is desired to connect the terminals of an instrument to the transformer secondary terminals, the cover is removed, thus causing the switch to short circuit the transformer secondary terminals. After the instrument has been connected to the transformer terminals, the cover is positioned on and attached to the terminal block, thus operating the short-circuiting switch to interrupt the connection between the secondary terminals.

An object of the invention is the provision of a terminal block for current transformers having a short-circuiting switch thereon and means for automatically operating the switch to a circuit closing position for short-circuiting the secondary circuit of the transformer, and having a cover which may be placed on and secured to the terminal block and when so placed and secured, biases the short-circuiting switch to its circuit opening position.

Another object of the invention is the provision of a short-circuiting switch of the above indicated character which may be so arranged as not to be operated to its circuit interrupting position upon the placing of the lever on the terminal block, if it is desired that the short-circuiting switch shall remain in its closing position until operated manually by other means.

Another object of the invention is the provision of a short-circuiting switch of the above indicated character in which the switch may be so arranged that it will not operate to close the circuit between the secondary terminals of the transformer when the cover is removed if it is desired that this operation shall not take place automatically upon movement of the terminal block cover.

Other objects and advantages of the invention will be apparent from the following description of a preferred embodiment of the invention, in which:

Figure 1 is a perspective view of a current transformer provided with the terminal block constructed in accordance with my invention;

Fig. 2 is a side elevational view of the terminal block cover;

Fig. 3 is a side elevational view of the block with the cover removed from the block;

Fig. 4 is a sectional view of the terminal block with the cover in position thereon;

Fig. 5 is a side elevational view of the terminal block with the cover removed and with the switch controlling element in a circuit opening position in which it is not operated automatically upon movement of the cover with respect to the block;

Fig. 6 is a vertical sectional view of the terminal block and cover attached with the switch controlling element in a circuit closing position and related in such a manner as not to be operated automatically upon movement of the cover with respect to the terminal block;

Fig. 7 is a side elevational view of a modified form of switch controlling element;

Fig. 8 is a top plan view of the element shown in Fig. 7; and

Fig. 9 is a sectional view of a portion of the terminal block with the cover removed showing another modified form of switch controlling element.

Referring to the drawing, a transformer is provided having a core structure 1 of magnetic material and a winding structure 2 having primary terminals 3 and a terminal block 4 to which the secondary terminals of the transformer are attached. The terminal block includes a base 5 of insulating material and a cover 6 adapted to be positioned thereon, the cover having openings 7 therein to accommodate the leads of an instrument that may be connected to the secondary terminals of the transformer. Secondary terminals 8 and 9 are mounted upon opposite ends of the base 5 and secured thereto by any suitable means such as the screw bolts 11. Terminal screws 12 are provided at the upper ends of the terminals beneath which the conductors of an instrument may be attached to the transformer terminals.

A pair of spring biased contact fingers 13 and 14 is provided, the lower ends 15 of which are shown positioned below the terminal members 8 and 9 and held in position between these members and the block 5 by the screws 11. The contact fingers extend upwardly and inwardly toward each other from the base for a considerable portion of their length and are bent outwardly at 16, the upper ends 17 extending upwardly from the base and outwardly from each other. The bent portions 16 provide the circuit closing portion of the fingers.

A guide member 18 shown in the form of a screw threaded element having a head 19 extends upwardly from the base 5 between the contact fingers 13 and 14 and is held on the base by the nuts 21 or other adequate means. This guide member serves to guide the movable button on switch member 22, the lower portion 23 of which, as shown in Figs. 3, 4 and 5, comprises a narrowed neck of current conducting material attached to an insulating portion of the member 22 and having an outwardly flaring conical surface 24 throughout its middle portion and an inwardly beveled end 25. The member 22 is provided with a central bore 26 that is sufficiently large to permit it to move freely along the guide member 18, and the upper end of the element 22, in the position shown in Figs. 3, 4 and 5, may be countersunk, as shown at 27 in Fig. 4, to receive the beveled end of an attaching screw 28 having a knurled head 29 and a shaft 31 that is provided with a screw threaded bore 32 so that it may be screw threadedly attached to the member 18.

When the switch button 22 is positioned on the guide member 18 between the portions 16 of the contact fingers 13 and 14 in a relation that the conducting segment 23 is at the lower part of the button as shown in Figs. 3 and 4, the biasing force of the leaf spring contact fingers 13 and 14 acting on the conical surfaces of the portion 24 will urge the button toward its circuit closing position, shown in Fig. 3. When the cover 6 is removed, the switch button 22 assumes this position, thus connecting the terminals 8 and 9 together through the fingers 13 and 14, and the conducting segment 23, thus reducing the transformer secondary voltage which is desirable when connecting or disconnecting the terminal conductors of an instrument to or from the transformer secondary terminals. After the instrument conductors have been connected to the transformer terminals, the cover 6 may be applied to the base 5, the central bore within the screw threaded nut 28 engaging the upper screw threaded portion of the guide member 18 and screws into place as shown in Fig. 4. As the nut 28 advances downwardly along the guide member 18, the lower end of the sleeve 31 engages the upper end of the button 22 along the beveled surface 27, forcing the button 22 downwardly against the bias of the contact fingers 13 and 14, inserting the widened insulating portion of the button 22 between the fingers 13 and 14 and causing these fingers to separate from engagement with the conducting ring 23, and interrupt the circuit between the terminal conductors 8 and 9 to permit the normal use of the instrument connected to the transformer.

If, for any reason, it is desired that the circuit between the terminals 8 and 9 remains open and not controlled by the application to or removal of the cover 6 from the base 5, the button 22 may be pressed down manually below the circuit closing portions 16 of the fingers to the position shown in Fig. 5, so that the entire button 22 is below the portions 16 of the fingers 13 and 14 which now engage the beveled surface 25 of the button 22, retaining it in position against the nuts 21 so that it will not move into circuit closing position upon removal of the cover 6 from the base 5.

If, on the other hand, it is desired to apply the button 22 on the guide member 18 in such a relation that the circuit between the terminal conductors 8 and 9 will be closed and remain closed regardless of the application of the cover 6 to the base 5, or the removal of the cover from the base, the button 22 may be applied with the conducting neck 23 at the upper end, as shown in Fig. 6. In this position, the button does not extend upwardly a sufficient distance to be engaged by the lower end of the sleeve portion 31 of the attaching nut 28, so that when the cover is attached to the base, the bias of the contact fingers 13 and 14 will continue to retain the button 22 in its circuit closing position.

It will be apparent from the foregoing description of an embodiment of the invention that I have provided a short-circuiting switch for terminal blocks of current transformers in which the switch may be readily adapted to automatically short circuit the secondary terminals upon removal of the cover from the terminal block, and automatically interrupt the connection between the secondary terminals upon attachment of the cover to the terminal block, and in which the switch may also be arranged, if desired, so as not to be actuated by the placing of the cover on the terminal block, or by the removal of the cover therefrom, and in which the switch may be left permanently either in its circuit interrupting position or in its circuit closing position without being effected by the movement of the terminal block cover.

In Figs. 7 and 8 is illustrated a movable button or switch member 42 having a conducting portion 43 attached to an insulating portion having two opposite sides 44 extending outwardly and upwardly and joining two inwardly sloping surfaces 45. A central bore 46 is provided to accommodate the guide member 18 and this bore terminates in a beveled or countersunk surface 47 for accommodating the lower end of the sleeve 31. The button 42 shown in Figs. 7 and 8 is provided with guard flanges 48 along two opposite sides of the contact fingers 13 and 14 when in place on the guide member 18. When operating the button manually from one to another of the positions shown in Figs. 3, 5 and 6, these flanges reduce the likelihood of the operator's fingers engaging any live metal part of the device.

In Fig. 9 is shown a button 52 having straight sides including a current conducting portion 53 and an insulating portion 54, the button being positioned between the contact fingers 13 and 14 and urged upwardly by a spring 55 positioned about the guide member 18 between the nuts 21 and the lower end of the button 52. The conducting portion 53 is shown as shorter in length than the insulating portion 54, and the button may be placed on the guide member 10 either side uppermost as may the other slider or contact buttons illustrated in the other figures of the drawing.

Modifications in the specific structure illustrated and described within the spirit of my invention will occur to those skilled in the art, and I do not wish to be limited otherwise than by the scope of the appended claims.

I claim as my invention:

1. A current transformer terminal block comprising a base, secondary terminals mounted on the base, means for short circuiting said terminals comprising switch contact members connected to said terminals and having spring biased contact fingers extending toward each other a contact button slidably positioned between said fingers and comprising a narrowed current conducting portion and a widened insulating portion flaring outwardly from the conducting portion and normally biased by said fingers to move the contact button to a position to close a circuit between said contact fingers through said conducting portion, and a cover formed to be positioned and secured upon said base and when so positioned to engage and move said button against the bias of said fingers to position the insulating portion of said button between the contact fingers for interrupting the circuit between said secondary terminals.

2. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, the contact fingers being bent at the contact portions to extend upwardly and outwardly, a contact button adapted to be slidably positioned between said fingers and comprising a narrowed neck portion formed of current conducting material and a skirt portion of insulating material flaring outwardly therefrom and formed at its outer end with an inwardly beveled portion, said contact button when positioned between said contact fingers with the contact fingers in engagement with the skirt portion thereof being biased by said contact fingers to a position to close a circuit between said contact fingers through said neck portion.

3. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, the contact fingers being bent at the contact portions to extend upwardly and outwardly, a contact button adapted to be slidably positioned between said fingers and comprising a narrowed neck portion formed of current conducting material and a skirt portion of insulating material flaring outwardly therefrom and formed at its outer end with an inwardly beveled portion, said contact button when positioned between said contact fingers with the fingers in engagement with the skirt portion thereof being biased by said fingers to a position to close a circuit between said fingers through said neck portion, and a cover formed to be positioned and secured upon said base and when so positioned to engage and move said button against the bias of said fingers to position the insulating portion of said button between the fingers for interrupting the circuit between said secondary terminals.

4. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, the contact fingers being bent at the contact portions to extend upwardly and outwardly, a contact button adapted to be slidably positioned between said fingers and comprising a narrowed neck portion formed of current conducting material and a skirt portion of insulating material flaring outwardly therefrom and formed at its outer end with an inwardly beveled portion, said contact button when positioned between said fingers with the fingers in engagement with the skirt portion thereof being biased by said fingers to a position to close a circuit between said fingers through said neck portion, said contact button being adapted to be placed between said fingers in either of two relations in one of which the button will be biased upwardly by said fingers to its circuit closing position and in the other of which the button will be biased downwardly to its circuit closing position, a cover formed to be positioned and secured upon said base, the button being so positioned by the contact fingers when applied between them in a relation to be moved upwardly to its circuit closing position by said contact fingers as to have a range of movement that it will be engaged and moved against the bias of said fingers to position the insulating portion of said button between the fingers for interrupting the circuit between said secondary terminals when the cover is positioned and secured upon said base, and when applied between the contact fingers in a relation to move downwardly to its circuit closing position by the contact fingers as to have a range of movement that it will not be engaged and moved against the bias of said fingers when the cover is positioned and secured upon said base.

5. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, the contact fingers being bent at the contact portions to extend upwardly and outwardly, a guide member extending upwardly from the base between said contact fingers and a contact button slidably positioned on said guide member and comprising a narrowed neck conducting portion and a flaring skirt portion of insulating material formed at its outer end with an inwardly beveled portion, said contact button when positioned between said fingers with the contact fingers in engagement with the skirt portion thereof being biased by said fingers to a position to close a circuit between said fingers through the neck portion, said contact button being adapted to be placed on said guide member with either its insulating portion or its conducting portion uppermost, a cover formed to be positioned and secured upon said base, the button being so positioned by the contact fingers when applied between them in a relation to be moved upwardly to its circuit closing position by said contact fingers as to have a range of movement that it will be engaged and moved against the bias of said fingers to position the insulating portion of said button between the fingers for interrupting the circuit between said secondary terminals when the cover is positioned and secured upon said base, and when applied between the contact fingers in a relation to move downwardly to its circuit closing position by the contact fingers as to have a range of movement that it will not be engaged and moved against the bias of said fingers when the cover is positioned in position and secured upon said base.

6. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, the contact fingers being bent at the contact portions to extend upwardly and outwardly, a guide member extending upwardly from the base between said contact fingers and a contact button slidably positioned on said guide member and comprising a narrowed neck conducting portion and a flaring skirt portion of insulating material formed at its outer end with an inwardly beveled portion, said contact button when positioned between said fingers with the contact fingers in engagement with the skirt portion thereof being biased by said fingers to a position to close a circuit between said fingers through the neck portion, and a cover formed to be positioned and secured upon said base and when so positioned to engage and move said button against the bias of said fingers to position the insulating portion of said button between the fingers for interrupting the circuit between said secondary terminals, the space between the contact fingers beneath the contact portions thereof being sufficient to accommodate the button in an inactive zone beyond the range of movement by said contact fingers.

7. A current transformer terminal block comprising a base, secondary terminals mounted on the base, means for short circuiting said terminals comprising switch contact members connected to said terminals and having spring biased contact fingers extending upwardly and inwardly toward each other and being bent to flare outwardly and away from each other at their outer ends to provide contact portions at the bends, a contact button slidably positioned between said fingers and comprising a narrowed current conducting neck portion and a widened insulating portion having a conical surface flaring outwardly from the neck portion and normally biased by said fingers to move the contact button to a position to close a circuit between said contact fingers through said neck portion, and a cover formed to be positioned and secured upon said base and when so positioned to engage and move said button against the bias of said fingers to position the insulating portion of said button between the contact portions of the contact fingers for interrupting the circuit between said secondary terminals.

8. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, a contact button adapted to be slidably positioned between said fingers and comprising a narrowed current conducting portion and a widened portion of insulating material flaring outwardly from the conducting portion and formed at its outer end with an inwardly beveled portion, said contact button when positioned between said contact fingers with the contact fingers in engagement with the widened portion thereof being biased by said contact fingers to a position to close a circuit between said contact fingers through said conducting portion, the insulating portion of said button having guard flanges on two opposite sides thereof for extending along opposite sides of said contact fingers.

9. A current transformer terminal block comprising a base, secondary terminals mounted on the base, means for short circuiting said terminals comprising switch contact fingers connected to said terminals and having circuit closing contact portions, a contact button adapted to be slidably positioned between said fingers and comprising a current conducting portion and an insulating portion, biasing means for urging said contact button to a position for placing the conducting portion of said button between said fingers to close a circuit between said fingers, and a cover formed to be positioned and secured upon said base and when so positioned to engage and move said button against the force of said biasing means to position the insulating portion of said button between the fingers for interrupting the circuit between said secondary terminals.

10. A current transformer terminal block comprising a base, secondary terminals mounted on the base, means for short circuiting said terminals comprising switch contact fingers connected to said terminals and having circuit closing contact portions, a contact button adapted to be slidably positioned between said fingers and comprising a current conducting portion and an insulating portion, biasing means for urging said contact button in a given direction to a predetermined limit of travel in that direction, said contact button being adapted to be placed between said fingers in either of two relations in one of which the button will be biased by said biasing means to its circuit closing position and in the other of which the button will be biased to its circuit opening position, a cover formed to be positioned and secured upon said base, the button being so positioned when applied between the contact fingers in a relation to be moved to its circuit closing position by said biasing means as to have a range of movement that it will be engaged by said cover and moved against the bias of said biasing means to position the insulating portion of said button between the fingers for interrupting the circuit between said secondary terminals when the cover is positioned and secured upon said base, and when applied between the contact fingers in a relation to be moved to its circuit opening position by said biasing means as to have a range of movement that it will not be engaged by said cover and moved against the bias of said biasing means when the cover is positioned and secured upon said base.

11. A current transformer terminal block comprising a base, secondary terminals mounted on the base, means for short circuiting said terminals comprising switch contact members connected to said terminals and having spring biased contact fingers extending upwardly from the base and converging upwardly and inwardly toward each other to provide circuit closing contact portions, a guide member extending upwardly from the base between said contact fingers and a contact button slidably positioned on said guide member and comprising a narrowed neck conducting portion and a flaring skirt portion of insulating material formed at its outer end with an inwardly beveled portion, said contact button when positioned between said fingers with the contact fingers in engagement with the skirt portion thereof being biased by said fingers to a position to close a circuit between said fingers through the neck portion, said contact button being adapted to be placed on said guide member with either its insulating portion or its conducting portion uppermost, a cover formed to be positioned and secured upon said base, the button being so positioned by the contact fingers when applied between them in a relation to be moved upwardly to its circuit closing position by said contact fingers as to have a range of movement that it will be engaged and moved against the bias of said fingers to position the insulating portion of said button between the fingers for interrupting the circuit between said secondary terminals when the cover is positioned and secured upon said base, and when applied between the contact fingers in a relation to move downwardly to its circuit closing position by the contact fingers as to have a range of movement that it will not be engaged and moved against the bias of said fingers when the cover is positioned in position and secured upon said base, said button having guard flanges on two opposite sides thereof for extending along opposite sides of said contact fingers.

12. A current transformer terminal block comprising a base, secondary terminals mounted on the base, means for short circuiting said terminals comprising switch contact fingers extending upwardly from the base and converging upwardly and inwardly toward each other to provide circuit closing contact portions, a guide member extending upwardly from the base between said contact fingers and a contact button slidably positioned on said guide member and comprising a conducting portion and an insulating portion, biasing means about said guide member for urging said biasing means upwardly from the base to a predetermined limit of travel in that direction to position the conducting portion of said button between said fingers to close a circuit between said fingers through the neck portion, and a cover formed to be positioned and secured upon said base and when so positioned to engage and move said button against the bias of said biasing means to position the insulating portion of said button between the fingers for interrupting the circuit between said secondary terminals.

JOHN H. CHILES, Jr.